(No Model.)
T. H. KINSMAN.
BREAD BOARD.
No. 488,712. Patented Dec. 27, 1892.
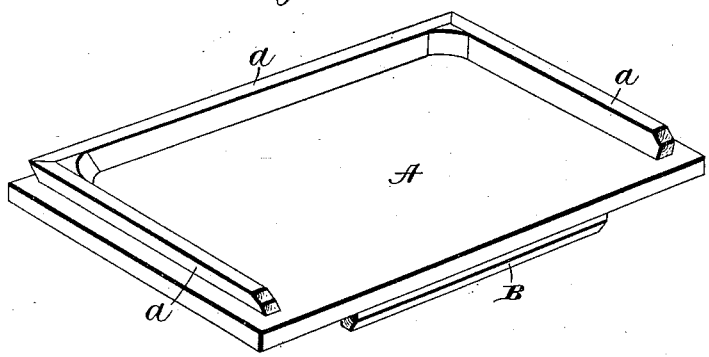
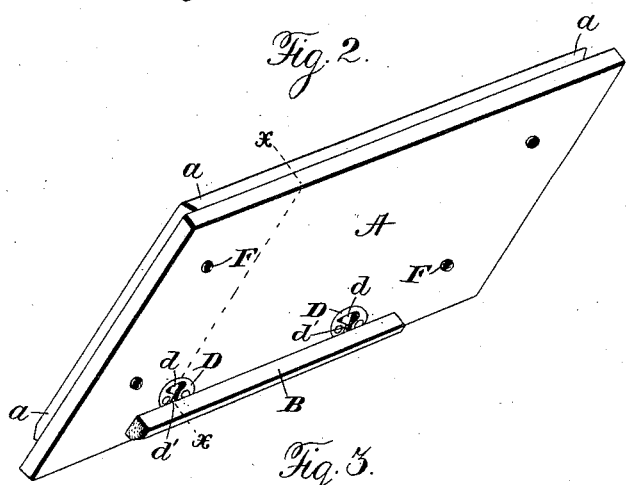
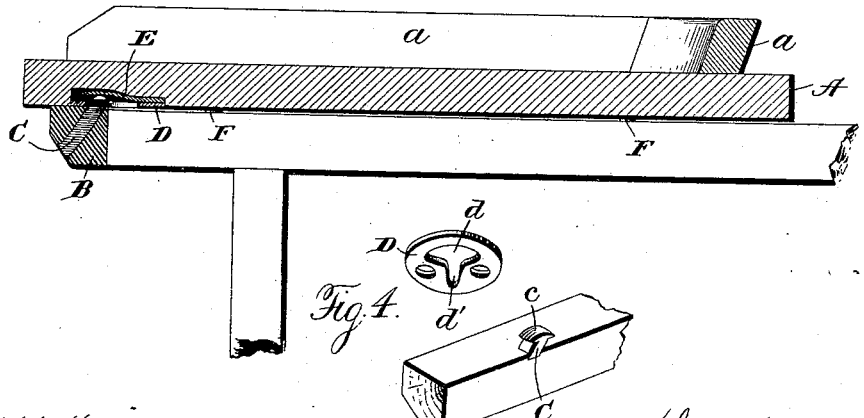
Witnesses:
Jas. E. Hutchinson.
Henry C. Hazard.
Inventor.
Thomas H. Kinsman
by Prindle and Russell
his Attorneys

UNITED STATES PATENT OFFICE.

THOMAS H. KINSMAN, OF OMAHA, NEBRASKA.

BREAD-BOARD.

SPECIFICATION forming part of Letters Patent No. 488,712, dated December 27, 1892.

Application filed May 4, 1891. Serial No. 391,494. (No model.)

*To all whom it may concern:*

Be it known that I, THOMAS H. KINSMAN, of Omaha, in the county of Douglas, and in the State of Nebraska, have invented certain new and useful Improvements in Bread-Boards; and I do hereby declare that the following is a full, clear, and exact description thereof, reference being had to the accompanying drawings, in which—

Figure 1 is a perspective view, from the upper side, of a board constructed in accordance with my invention; Fig. 2 a similar view showing the underside; Fig. 3, a section on the line $x-x$, Figs. 1 and 2; and Fig. 4, a detail view in perspective, showing the means used to attach the removable cleat or strip to the underside of the board.

Letters of like name and kind refer to like parts in each of the figures.

The object of my invention is to provide a board for use in kneading dough, which will retain upon its surface the flour, or whatever material may be used, and also to insure the stability of the board against such movement as might be imparted to it during a kneading operation.

To accomplish these ends said invention consists in the bread board constructed substantially as hereinafter specified.

Upon a board, A, of wood, having such shape and proportions as convenience, or necessity, may suggest (the shape being, preferably, rectangular) I place at a short distance from, and parallel with its edge, an upwardly extending flange or rim $a$. Said flange, or rim is placed only at the sides and back, not at the front, and is upon the side or face of the board which is to receive and hold the material to be operated on, and it should have such height, as will best enable it to confine or retain upon the board, such material. Preferably, this flange, as shown, stands obliquely to the surface of the board, its inner face forming an obtuse angle therewith, and the corners that are formed by the junction of the side and back pieces are curved or rounded or beveled to prevent the formation of an angular pocket. With this latter arrangement there cannot be the lodgment and accumulation of material which would occur were these corners left angular, and the board is thus rendered more easy to clean and to be kept so. The same advantage also accrues from arranging said rim obliquely with reference to the surface of the board, so as to form an obtuse, rather than a right angle. The rim or flange $a$ can be secured to the board in any suitable manner, as by gluing.

An objectionable feature attendant upon the use of bread boards, as ordinarily made, is their instability or likelihood of movement during a dough kneading process. This defect, I have overcome by the provision of means which insure all needed stability, which means consist of a projection on the underside of the board adapted to engage the edge of the table top or other surface on which the board may be placed for use, and small rubber projections, also on the underside of the board to frictionally engage the supporting surface. The projection for engagement with the table edge, I make, by preference, in the form of a cleat or strip B, somewhat shorter than the board is wide, and set a short distance back from and parallel with its front edge. I attach the cleat to the board not fixedly, or permanently, but removably, and, for this purpose, provide, at a point a short distance from each end, a pin C having a head $c$ between which and the cleat there is a small space. This headed pin is designed to engage or co-operate with an elongated opening or slot formed in a thin plate D, fastened to the underside of the board A, and being countersunk therein, so as to have its exposed surface flush with that of the board. The slot in the plate D has a wide portion $d$ into and through which can be readily passed the head $c$ of the pin, and a narrow portion $d'$ whose width is the same as the body of said pin, but less than that of the head, so that, if the pin be placed with the head in the wide portion $d$ and beyond the inner face of the plate D, and then be moved in the direction of the narrow portion, the shank or body will pass into the latter and the head into position to engage the portions of the inner face of the plate adjacent to the said narrow portion of the slot, which engagement will occur, because of the greater width of said head compared with the slot. It is to be understood, of course, that a recess or cavity is provided in the board to accommodate the head $c$. To hold or lock the cleat or strip against accidental dislodgment, when attached to the board by the means above described, a spring plate E is provided in the recess or cavity above the plate D having one end fastened to the board A, and the other free, the latter of which being caused to bear against the head c when the latter is in proper relation thereto. To disconnect the cleat or strip B from the board A, it is necessary simply to move it, so that the heads of the pins C may be disengaged from the plate D by passing them into the wide portions $d'$ of the slot therein. The pins C are located at the rear corners of the cleat, which, it is to be noted, is specially advantageous over a location at any other point, inasmuch as, when the cleat is placed against the edge of a table, as shown in Fig. 3, movement of the board in a direction from the operator, will tend to cause the whole board-engaging surface of the cleat to bear closely against the board, thus adding to the strength and firmness of the device. Said pins, too as a strength-obtaining expedient are disposed diagonally in the cleat.

Of course, the greatest tendency to movement of the board during a kneading operation is away from the operator, as the force most exerted is a pushing one, and for this reason the projection to engage the table or other surface edge, should have the situation which I have given the cleat or strip B. To supplement the latter, I provide adjacent to each of the four corners of the board, on its underside, a small piece of rubber F which projects a little beyond the surface thereof. These pieces of rubber will be found to afford sufficient friction to aid the cleat or strip, and to prevent movement of the board toward the operator, although not sufficient to enable them to perform the function of the cleat, so that it might be dispensed with.

A bread board constructed in accordance with my invention, is conducive to neatness, besides possessing the advantage of insured stability, when in use, and can be manufactured at small expense.

Having thus described my invention, what I claim is—

1. In combination, a bread board, the slotted plates in its underside the slots therein consisting of wide and narrow portions, the cleat or strip having headed pins to engage such slots, and the springs to engage the pins, substantially as and for the purpose specified.

2. In combination with a bread board, a projection on its underside to engage the edge of a support, as a table top, and the rubber pieces to frictionally engage the surface of the support, substantially as and for the purpose specified.

3. In combination with a bread board a cleat or strip removably attached thereto, the attaching means consisting of slots in the board and pins placed diagonally in the strip and projecting therefrom at its upper rear corner, and springs attached to the board and bearing upon said pins, substantially as and for the purpose set forth.

In testimony that I claim the foregoing I have hereunto set my hand this 16th day of March, 1891.

THOMAS H. KINSMAN.

Witnesses:
 THEODORE JOHNSON,
 L. H. BRADLEY.